Patented Dec. 16, 1930

1,785,309

UNITED STATES PATENT OFFICE

ARTHUR HOUGH, OF SUMMIT, NEW JERSEY, AND JOHN GEORGE HARRISON, OF NEW YORK, N. Y.; SAID HOUGH ASSIGNOR TO SAID HARRISON

METHOD AND PRODUCT FOR PREVENTING EFFLORESCENCE IN CERAMICS

No Drawing. Application filed June 15, 1927. Serial No. 199,124.

The present invention relates to the production of ceramic articles, enamel and enamel ware. More particularly the invention relates to a process for preventing efflorescence and scumming in the production of ceramic articles, and relates further to preventing efflorescence or scumming by the use of barium silicate.

In the manufacture of ceramics and particularly in the manufacture of bricks, barium fluoride, carbonate, chloride and hydroxide have been heretofore employed to prevent what is known as efflorescence and scumming by virtue of the interaction of these compounds with the sulphates and other compounds contained in the clay or water used. The sulphates may also be formed upon the surface of the brick or other ceramic article during the burning by the condensation of sulphuric acid upon them from the heating gases or by the direct action of sulphur trioxide which is usually contained in the heating gases. Among the sulphates which commonly produce efflorescence are calcium and magnesium sulphates.

The barium compounds, such as the fluoride carbonate, chloride and hydroxide, which have heretofore been used for preventing efflorescence and scumming, are relatively costly and the barium silicate which is used according to the present invention is far better from the viewpoint of both cost and suitability.

In accordance with the present invention barium silicate is used to prevent scumming in ceramic manufacture, and particularly in the manufacture of bricks, tiles, terra-cotta, sewer pipes and other products made of clay or similar materials. The action of barium silicate ($BaSiO_3$) in preventing efflorescence and scumming is indicated in the following equation wherein calcium sulphate, an efflorescence and scum producing compound, is taken as illustrative:

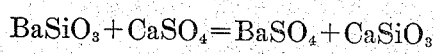

$$BaSiO_3 + CaSO_4 = BaSO_4 + CaSiO_3$$

The reaction takes place during the heating of the articles and results in the production of the very insoluble barium sulphate and calcium silicate which is also highly insoluble. The products of the reaction will therefore be practically insoluble, and if the proportions of the ingredients are carefully adjusted so as not to have too great an excess of the barium silicate, an exact balance of the products will follow.

The barium silicate is preferably added in the finely divided condition to the mass or clay used to make the particular ceramic product desired. Generally speaking, about the same quantity of barium silicate is required in bricks and ceramics generally as is now used of barium carbonate. However, it will be appreciated that the quantity of barium silicate depends entirely on the soluble salts in the clay and these vary. The practical method of determining the amount of barium silicate is to analyze the clay for the soluble salts such as sulphates and then it is a simple chemical calculation, known to chemists generally, to determine the exact amount of barium silcate required to completely react with all the sulphates. As a rough approximation, the amount of barium silicate might vary anywhere from 2 to 7 pounds per 1,000 bricks, but these proportions will naturally vary depending upon the sulphate content of the bricks as explained above. It should also be understood that the soluble salt content of the water used in making the ceramic products should be taken into account in calculating the amount of barium silicate as these salts are added to the clay or other mass when the water is added to them.

The addition of the finely divided barium silicate should be accompanied by thorough mixing so as to uniformly distribute it through the ceramic mass before baking or burning. The formation of the ceramic mass and the baking or burning takes place in the usual manner.

The barium silicate is readily and easily prepared by fusing barium sulphate (native barytes) with silica, for example sand. The temperatures at which these materials interact and fuse are within the limits of temperature produced by the blast furnace and hence the reaction may be caused to take place in such a furnace. The reaction takes place in accordance with the following equation:

$$BaSO_4 + SiO_2 = BaSiO_3 + SO_3$$

The proportions of barium sulphate and silicon dioxide (figured as pure materials) called for by this equation may be used, namely 233.44 parts of barium sulphate and 60.3 parts of silicon dioxide. The reagents are preferably used in a pulverized condition and the reaction takes place at about 1300° C. It is to be understood that forms of silica other than sand can be used, for example kieselguhr. The reaction may also be carried out in an electric furnace providing the same heat intensity. The reaction can also be carried out by heating a mixture of sand and finely divided barium sulphate in a crucible to the point of fusion or to about 1300° C., and holding the temperature at that point until the reaction has gone to completion.

It will be seen from the above reaction of barium sulphate and silica that sulphur trioxide is produced. This gaseous product may be condensed in water to produce sulphuric acid as a by-product. The collection of these gases or fumes will be readily understood by a person skilled in the art and no detailed explanation of how they should be collected is believed to be necessary.

Most commercial barytes contain a considerable quantity of silica and this quantity of silica must be considered in the calculation of the amount of sand or silica to be mixed with the barytes for fusion. Then again, the actual content of $BaSO_4$ must be calculated in the raw barytes and the amount of sand or silica calculated from this. It will be seen, therefore, that by this process the percentage of sand or silica in the raw barytes may be an advantage, inasmuch as this will go towards the amount needed for the reaction as well as enabling a cheap and impure grade of barytes being used to advantage.

The barium silicate made by the present process may be employed advantageously in the glass industry in place of other barium compounds, such as barium carbonate, hitherto used, and when the barium silicate is so employed a glass of very high refractive index, of great brilliance, together with unusual toughness is produced. As indicated above, the barium silicate may also be used with exceptionally good results in the manufacture of sanitary enamel ware and enamel and is used substantially in the same manner and proportions as barium carbonate in these applications.

While we have indicated above the reaction which we believe to take place between barium sulphate and silica, yet it is quite possible that another or a series of barium silicates may be formed, and we do not wish it to be understood that we limit ourselves to the particular barium silicate indicated by the chemical equation given. We have found however that the product of the reaction does have utility in the relationships defined and hence has utility independently of knowledge of the exact compound produced. It is therefore to be understood that by barium silicate we mean barium silicates generally in contradistinction to any particular barium silicate.

Having described our invention what we claim is:

1. The process of preventing efflorescence or scumming in ceramics which comprises adding barium silicate to the material from which the ceramics are made.

2. The process of preventing efflorescence or scumming in baked or burned silicious material which comprises adding silicate of barium to the silicious mass prior to baking or burning.

3. In the art of preventing efflorescence in the manufacture of ceramics and glass, the addition to the batch, prior to baking, of barium silicate as an agent for preventing efflorescence or scumming.

4. As an intermediate product, an unbaked ceramic article having finely divided barium silicate distributed throughout the body.

5. A process for preventing efflorescence or scumming in ceramic material which comprises adding to the unbaked ceramic material a barium silicate which is insoluble in cold water and decomposes in hot water.

In testimony whereof we affix our signatures.

ARTHUR HOUGH.
JOHN GEORGE HARRISON.